US009298050B2

(12) United States Patent
MacPherson et al.

(10) Patent No.: US 9,298,050 B2
(45) Date of Patent: Mar. 29, 2016

(54) TERAHERTZ IN-PLANE AND TERAHERTZ OUT-OF-PLANE SWITCHING LIQUID CRYSTAL DEVICES

(75) Inventors: Emma MacPherson, Hong Kong (CN); Hongkyu Park, Hong Kong (CN); Fan Fan, Hong Kong (CN); Vladimir Grigorievich Chigrinov, Hong Kong (CN); Edward Philip John Parrott, Hong Kong (CN)

(73) Assignees: The Hong Kong University of Science and Technology, Hong Kong (CN); The Chinese University of Hong Kong, Hong Kong (CN)

( * ) Notice: Subject to any disclaimer, the term of this patent is extended or adjusted under 35 U.S.C. 154(b) by 537 days.

(21) Appl. No.: 13/599,740

(22) Filed: Aug. 30, 2012

(65) Prior Publication Data

US 2013/0050602 A1  Feb. 28, 2013

Related U.S. Application Data

(60) Provisional application No. 61/573,091, filed on Aug. 31, 2011.

(51) Int. Cl.
*G02F 1/1343* (2006.01)
*G02F 1/139* (2006.01)

(52) U.S. Cl.
CPC ........ *G02F 1/134363* (2013.01); *G02F 1/1393* (2013.01); *G02F 2001/134381* (2013.01); *G02F 2203/13* (2013.01); *G02F 2203/50* (2013.01)

(58) Field of Classification Search
CPC ... G02B 5/3016; G02F 1/1326; G02F 1/1393; G02F 1/134363

USPC .......................................... 349/193–202, 141
See application file for complete search history.

(56) References Cited

U.S. PATENT DOCUMENTS 6,549,258 B1 * 4/2003 Shin et al. ..................... 349/141
7,826,504 B2 * 11/2010 Chen et al. .................. 372/43.01
(Continued)

FOREIGN PATENT DOCUMENTS

JP          53-48542       *   5/1978

OTHER PUBLICATIONS

Pan et a., Control of enhanced THz transmission through metallic hole arrays using nematic liquid crystal, May 2005, vol. 13, No. 11, Optics Express, pp. 39213930.*

(Continued)

*Primary Examiner* — Dung Nguyen
(74) *Attorney, Agent, or Firm* — Leydig, Voit & Mayer, Ltd.

(57) ABSTRACT

A liquid crystal cell structure comprising transparent terahertz (THz) windows, alignment layers, protective layers, in-plane electrodes, out-of-plane electrodes, and a liquid crystal (LC) layer. The in-plane electrodes generate in-plane electric fields that are parallel to the liquid crystal layer and the out-of-plane electrodes generate out-of-plane electric fields that are perpendicular to the liquid crystal layer. The in-plane and out-of-plane electrodes have wire-grid patterns to increase THz wave transmission efficiency. The wire-grid patterned electrodes are transparent to THz waves that have parallel polarization compared to a grating vector of the wire grid pattern and are opaque to THz waves of perpendicular polarization. These two electrodes are controlled independently to tune the optical properties of the LC and improve the operating speed of THz LC devices.

12 Claims, 7 Drawing Sheets

(56) References Cited

U.S. PATENT DOCUMENTS

| 7,940,368 | B2 | 5/2011 | Chao et al. |
| 2005/0024359 | A1 | 2/2005 | Pan et al. |
| 2007/0188668 | A1 | 8/2007 | Pan et al. |
| 2009/0002581 | A1 | 1/2009 | Chao et al. |

OTHER PUBLICATIONS

Chen et al., "Room temperature terahertz phase shifter based on magnetically controlled birefringence in liquid crystals," *Applied Physics Letters*, 83, 4497, 2003.

Chen et al., "Liquid-crystal-based terahertz tunable Lyot filter," *Applied Physics Letters*, 88, 101107, 2006.

Chen et al, "Magnetically tunable room-temperature 2π liquid crystal terahertz phase shifter," *Optics Express*, vol. 12(12), 2004.

Chodorow et al., "Terahertz properties of fluorinated liquid crystals," *Liquid Crystals*, 40(11), 1586-1590, 2013.

Ho et al, "Liquid-crystal-based terahertz tunable Solc filter," *Optics Letters*, vol. 33(13), Jul. 2008.

Hsieh et al., "Polarizing terahertz waves with nematic liquid crystals," *Optics Letters*, vol. 33(11), Jun. 2008.

Hsieh et al., "Voltage-controlled liquid-crystal terahertz phase shifter and quarter-wave plate," *Optics Letters*, 31(8), Apr. 2006.

Hu et al., "Liquid Crystal Tunable mm Wave Frequency Selective Surface," *IEEE Microw. and Wireless Comp. L.*, vol. 17(9), Sep. 2007.

Jewell et al., "Tuneable Fabry-Perot etalon for terahertz radiation," *New J. Phys.*, 10 033012, 2008.

Lin et al., "Self-polarizing terahertz liquid crystal phase shifter," *AIP Advances 1*, 032133, 2011.

Lin et al., "Electrically Controlled Liquid Crystal Phase Grating for Terahertz Waves," *IEEE Photonics and Tech. L.*, vol. 21(11), Jun. 2009.

Lin et al., "Manipulating terahertz wave by a magnetically tunable liquid crystal phase grating," *Optics Express*, vol. 16(5), 2008.

Tsai et al., "Electrically Controlled Room Temperature Terahertz Phase Shifter with Liquid Crystal," *IEEE Microw. and Wireless Comp. L.*, vol. 14(2), Feb. 2004.

Wilk et al., "Liquid crystal based electrically switchable Bragg structure for THz waves," *Optics Express*, vol. 17(9), 2009.

Wu et al., Electrically Tunable Room-Temperature 2π Liquid Crystal Terahertz Phase Shifter, *IEEE Photonics Tech L.*, vol. 18(14), Jul. 2006.

Zhang et al., "Liquid-crystal-filled phototonic crystal for terahertz switch and filter," *J. Opt. Soc. Am.*, 26(1), Jan. 2009.

\* cited by examiner

TERAHERTZ IN-PLANE AND TERAHERTZ OUT-OF-PLANE SWITCHING LIQUID CRYSTAL DEVICES

CROSS REFERENCE TO RELATED APPLICATIONS

This application claims benefit of U.S. provisional patent application Ser. No. 61/573,091, filed on Aug. 31, 2011, which is hereby incorporated by reference in its entirety.

BACKGROUND

Terahertz (THz) waves refer to electromagnetic radiation in the frequency interval between 0.1 and 10.0 THz (i.e., 1 THz=$10^{12}$ Hz). THz waves have been investigated for use in various fields, including gas sensing, explosives detection, security screening, biomedical imaging, non-destructive evaluation, and other interdisciplinary studies. However, the use of THz waves is still relatively immature compared to other well-developed sensing and imaging techniques such as the microwave, mid-infrared, infrared, and visible regimes.

As described, some of the most active research areas in THz technology are related to developing THz imaging systems for security screening, biomedical imaging, and non-destructive evaluation for quality monitoring. A compact and real-time THz imaging system is especially needed to compete with other well-developed imaging techniques and to be applied in these areas.

THz imaging systems can be continuous-wave (CW) THz systems or pulsed THz systems. There are several ways to develop a fast CW THz imaging system, including, for example, using a micro-bolometer array detector fast-scanning system with a 2D (two-dimensional) galvanometer and compressed sensing techniques. In compressed sensing, the optical alignment of the system is simple and can operate using only a single point detector. However, there are technical limits to building a real-time THz imaging system based on compressed sensing—namely, a compact and fast THz spatial mask is needed to acquire images. Previous work used several metal masks with different patterns to measure the THz image using compressed image sensing technique, but it is not possible to make a compact and real-time CW THz imaging system using this conventional approach. A compact, efficient, and fast THz spatial mask is therefore necessary to overcome these drawbacks of conventional approaches.

Liquid crystals (LCs) have been used in the visible regime to make state-of-the-art optical devices, such as flat panel displays and screen projectors. LCs have been used as filters, phase shifters, and tunable Bragg reflectors at THz frequencies. LCs typically have large birefringence, comparably small absorption in the THz range, and can be controlled by electric or magnetic fields. In addition, a THz modulator can be implemented using LCs and the THz modulator is the unit cell of THz spatial mask. To design THz optical devices based on LCs, optical properties of LCs in the THz range are required. Several different kinds of liquid crystal mixtures such as, for example, E7 and BL037, have birefringences of 0.1~0.2 at THz frequencies. Electric or magnetic fields can control the optical properties of LCs and THz optical devices such as a phase shifter, a filter, and a polarizer can be controlled using them. However, THz optical devices controlled by magnetic fields have a limit on the aspect of device integration due to the size of the magnet.

The conventional structure of liquid crystal devices for visible light has optically transparent electrodes to visible light that are opaque at THz frequencies. This makes it difficult to design efficient THz optical devices. Additionally, THz LC devices need approximately wavelength compatible thickness of the liquid crystal layer to control the phase retardation of THz waves. Therefore, the thickness of the liquid crystal layer should be at least several hundredths of micrometer (which is much thicker than for visible light). Also, the operating speed of THz LC devices using conventional designs for visible light is not fast enough for practical applications because the operating speed is inversely-proportional to the thickness of liquid crystal layer.

One prior art approach involves a tuneable THz etalon based on liquid crystals. This etalon uses an ITO (indium tin oxide) layer on the input and output THz windows to control the operating wavelength. However, the ITO layer reflects incident THz waves and is needed to increase the transmission efficiency of THz waves to design practical THz optical devices.

In another prior art approach, a Bragg structure based on LCs can operate in the THz range. The device has electrodes on the side wall to increase the THz transmission and control the operating wavelength, but the response time is the order of hundreds of milliseconds because the liquid crystal layer thickness is so thick. It is not fast enough to design practical devices for real-time imaging systems such as for security cameras or biomedical imaging systems.

Other prior art approaches have developed a phase shifter based on magnetically controlled liquid crystal devices for THz waves, developed a tunable THz wavelength selector based on LCs, and shown that LCs can be used for the polarizing component of THz polarizers. However, these THz optical devices based on LCs are operated by magnetic fields using mechanical control methods, making them unsuitable for use in compact and fast THz systems.

What is needed is an efficient, compact, and fast THz optical device based on liquid crystals for use in THz switches, THz modulators, THz waveplates, and THz spatial masks using liquid crystal that overcomes the drawbacks and limitations of conventional approaches related to transmission efficiency, response time, and size.

SUMMARY

One embodiment of the invention provides a liquid crystal cell controlled by electric fields. The liquid crystal cell includes a first window transparent at terahertz (THz) frequencies between 0.1 THz to 10.0 THz; a liquid crystal layer; in-plane switching electrodes that generate in-plane electric fields over the liquid crystal layer; and out-of-plane switching electrodes that generate out-of-plane electric fields that are perpendicular to the liquid crystal layer; wherein the in-plane switching electrodes and the out-of-plane switching electrodes are controlled independently to tune optical properties of the liquid crystal cell.

DETAILED DESCRIPTION

Some embodiments of the invention relate to apparatuses, methods, and devices for a liquid crystal (LC) cell structure. More specifically, some embodiments of the invention utilize a liquid crystal layer and two independent electrodes, in-plane electrodes and out-of-plane electrodes, to develop fast and efficient optical devices for the terahertz (THz) waves (i.e., 1 THz=$10^{12}$ Hz).

Some embodiments of the invention provide for an efficient THz liquid crystal device structure comprising transparent THz windows, protective layers, alignment layers, in-plane electrodes, out-of-plane electrodes, and a liquid crystal layer. Conventional optical LC devices structures have several design limitations, including operating speed and THz transmission efficiency. To overcome these design limitations, some embodiments of the invention have two independent electrodes, in-plane electrodes and out-of-plane electrodes, to increase the operating speed. In addition, some embodiments of the invention have wire-grid patterns to improve the THz transmission efficiency.

Also, some embodiments of the invention are controlled by electric fields, and not by magnetic fields. These embodiments can be easily integrated into many kinds of THz optical systems. To increase the transmission efficiency of THz waves through the devices, the out-of-plane electrodes can also have wire grid patterns. The out-of-plane electrodes are transparent to a specific polarization of THz waves that are parallel to the direction of wire-grid grating vector so it can increase the transmission efficiency of THz waves.

Moreover, it is possible to use metals to fabricate the electrodes instead of optically transparent materials such as ITO (indium tin oxide) and the electrode thickness can be thick enough to decrease the impedance of the electrodes. Optical devices based on LC need approximately wavelength compatible thickness of the liquid crystal layer to control the phase retardation, so this thickness for THz waves should be at least several hundredths of micrometers. The phase retardation ($\Delta\theta$) of the liquid crystal layer can be controlled by the thickness ($d_{1c}$) and birefringence ($\Delta n_{1c}$) using Equation 1 below:

$$\Delta\theta = \Delta n_{1c} d_{1c} 2\pi/\lambda \qquad \text{(Equation 1)}.$$

The operating mode of the liquid crystal layer such as $\lambda/2$ waveplate or $\lambda/4$ waveplate is determined by the thickness of liquid crystal layer ($d_{1c}$). In some embodiments, protective layers can be applied on the THz window or THz mirror to improve the stability and life-time of THz optical devices.

The THz liquid crystal layer is implemented on a transparent THz window (for example, fused silica, TOPAS®, HDPE (high-density polyethylene), or TPX (polymethylpentene)) with an aligned liquid crystal layer working as a $\lambda/2$ waveplate at the operating wavelength. The alignment layer is used to define the initial alignment for liquid crystal molecules, and improve the stability of the liquid crystal layer. It is possible to use rubbing, SiO (silicon monoxide) oblique evaporation, ion beam etching, photo-alignment, or any other methods that provide the uniform alignment for fabricating alignment layer. The refractive index of the LC film is then varied according to the electric field directions—in-plane or out-of-plane—and subsequently the polarization of transmitted THz wave through the LC film can be manipulated by these electric fields.

The in-plane electrodes generate in-plane electric fields that are parallel to the liquid crystal layer and the out-of-plane electrodes generate out-of-plane electric fields that are perpendicular to the liquid crystal layer. Also, the in-plane and out-of-plane electrodes can have optimized wire-grid patterns to increase the THz wave transmission efficiency. The wire-grid patterned electrodes are transparent to the THz wave that has parallel polarization compared to the grating vector of the wire-grid and are opaque to the perpendicular polarization. In some embodiments, electrodes that have a wire-grid pattern behave as a polarizer and allow THz to be transmitted; whereas, if a solid metal electrode were used, then all the THz would be blocked. These two electrodes are controlled independently to tune the optical properties of the liquid crystal and improve the operating speed of THz LC devices. The liquid crystal layer is working as a phase retarder at THz frequencies and the operation mode such as $\lambda/4$ or $\lambda/2$ waveplate (where $\lambda$ is the wavelength of the incident light) is determined by the thickness of the layer.

Moreover, some embodiments of the invention have two configurations, transmissive mode and reflective mode. The transmissive THz LC devices have wire-grid electrodes placed on both input and output THz windows. The polarization of the output THz waves are determined by the angle of the electrodes on output THz window. The reflective THz LC devices have a wire-grid electrode placed on the input THz window and a THz mirror on the rear side of the liquid crystal layer. Protective layers can be applied on the THz window or THz mirror to improve the stability and life-time of THz optical devices.

Figure 1A:
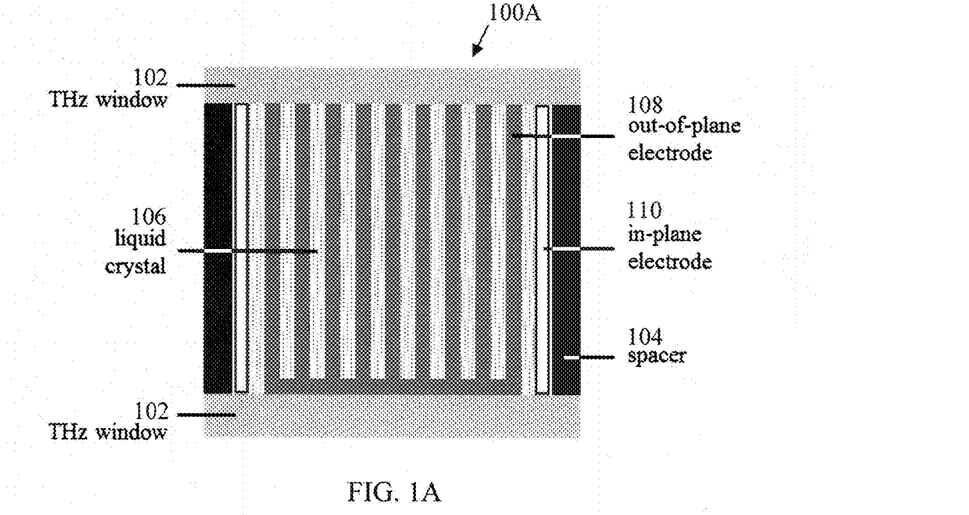
FIG. 1A is top-view schematic of a terahertz (THz) liquid crystal (LC) device, according to one embodiment.

FIG. 1A is top-view schematic of a terahertz (THz) liquid crystal (LC) device 100A, according to one embodiment. The THz LC device 100A includes THz windows 102, a spacer 104, liquid crystal 106, out-of-plane electrodes 108, and in-plane electrodes 110. In this definition, the plane is the plane of the electrodes. "In-plane" means the parallel plane relative to the plane of the electrodes, and "out-of-plane" means the perpendicular plane relative to the plane of the electrodes. The in-plane electrodes are used to generate the electric fields parallel to the electrode layer and the out-of-plane electrodes are used to generate the electric fields perpendicular to the electrode layer. In some embodiments, the THz windows 102 are transparent. The in-plane electrodes 110 and out-of-plane electrodes 108 are placed on the THz windows 102. In some embodiments, the THz LC device 100 has more than one pair of in-plane electrodes 110 to decrease the operating voltage. For example, if the device has in-plane electrodes on both THz windows like in FIG. 1B or FIG. 2B, half of the operating voltage is needed because of symmetry compared to a device that has in-plane electrodes on a single side. A spacer 104 separates the THz windows 102.

Figure 1B:
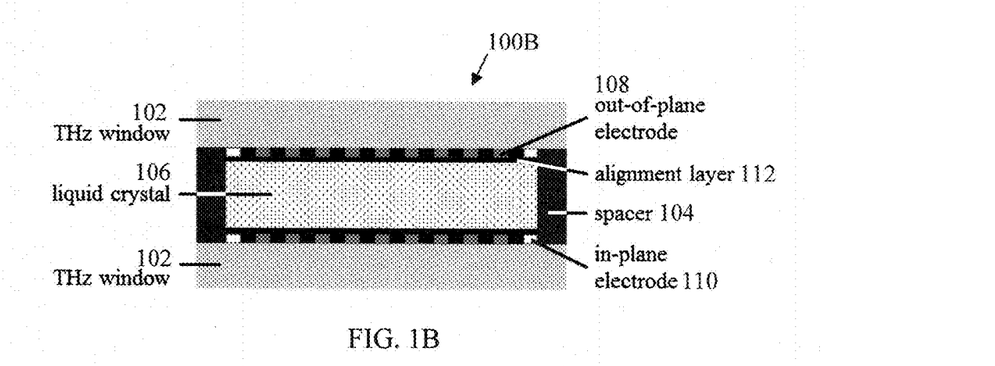
FIG. 1B is cross-sectional view schematic of a transmissive THz LC device, according to one embodiment.

FIG. 1B is cross-sectional view schematic of a transmissive THz LC device 100B, according to one embodiment. The THz LC device 100B includes THz windows 102, a spacer 104, liquid crystal 106, out-of-plane electrodes 108, in-plane electrodes 110, and an alignment layer 112. In some embodiments, the THz windows 102 are transparent. The alignment layer 112 is used to define the initial alignment for liquid crystal molecules, and improve the stability of the liquid crystal layer.

Figure 1C:
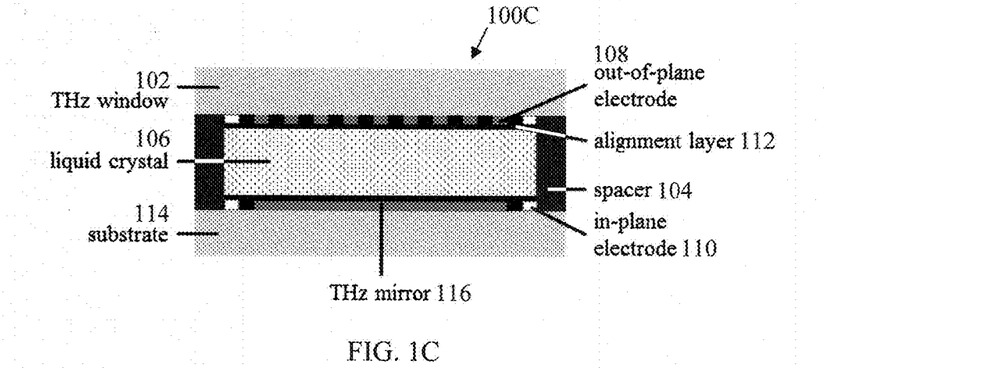
FIG. 1C is cross-sectional view schematic of a reflective THz LC device, according to one embodiment.

FIG. 1C is cross-sectional view schematic of a reflective THz LC device 100C, according to one embodiment. The THz LC device 100C includes a THz window 102, a spacer 104, liquid crystal 106, out-of-plane electrodes 108, in-plane electrodes 110, an alignment layer 112, a substrate 114, and a THz mirror 116. In some embodiments, the THz window 102 is transparent. As shown, a wire-grid electrode is placed on the input THz window 102 and a THz mirror 116 is placed on the rear side of the liquid crystal layer on substrate 114.

Some embodiments use in-plane and out-of-plane electrodes to generate two independent electric fields that are used to manipulate the direction of liquid crystal molecules. The gap between an upper in-plane electrode and a lower in-plane electrode (see, e.g., FIG. 1B) is similar to or larger than a thickness of a liquid crystal 106 layer (e.g., sub-mm) to optimize a bias condition. When the THz beam size is small enough compared to the unit cell size, some embodiments use one unit cell to control the THz beam. If the THz beam is larger than the unit cell, some embodiments use an array of unit cells as in FIGS. 2A-2B.

The electrodes 108, 110 can change the angle of liquid crystal director into two directions independently, as shown below in FIGS. 2A-2B.

Figure 2A:
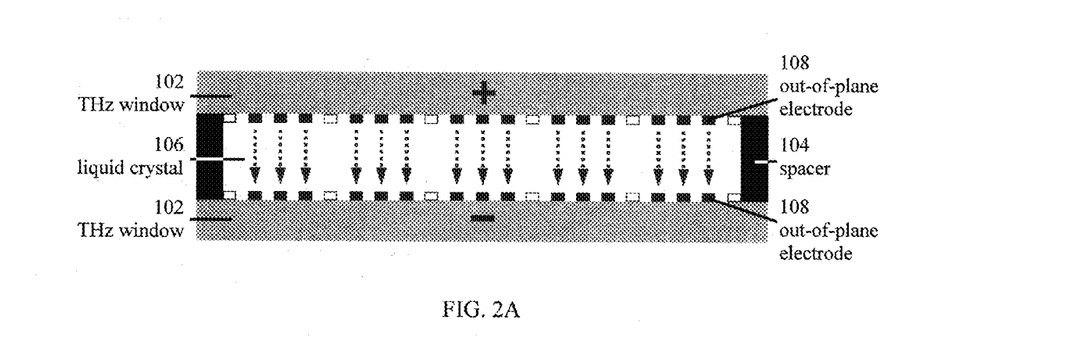
FIG. 2A is the electric bias field of out-of-plane electrodes, according to one embodiment.

FIG. 2A is the electric bias field of out-of-plane electrodes, according to one embodiment. As shown, the electric field lines of the out-of-plane electrodes 108 point in a direction from a positively charged in-plane electrode to a negatively charged in-plane electrode. In the example shown, the electric field lines point from an upper THz window 102 to a lower THz window.

Figure 2B:
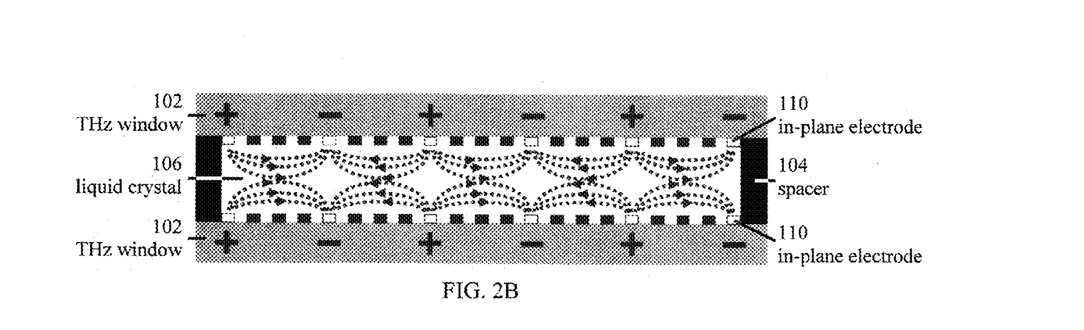
FIG. 2B is the electric bias field of in-plane electrodes, according to one embodiment.

FIG. 2B is the electric bias field of in-plane electrodes, according to one embodiment. As shown, the electric field lines of the in-plane electrodes 110 point within the liquid crystal 106 in a direction from a positively charged in-plane electrode to a negatively charged in-plane electrode.

In some embodiments, the grating vector of wire-grid patterned electrodes on the input window is parallel to the polarization of input THz waves so that THz waves can pass through the input window efficiently. Then, the THz waves go through the liquid crystal layer to control optical properties using birefringence. On the output window, some embodiments of the invention can have the wire-grid patterned electrodes for transmissive devices, as shown in the examples in FIG. 3A and FIG. 3B.

Figure 3A:
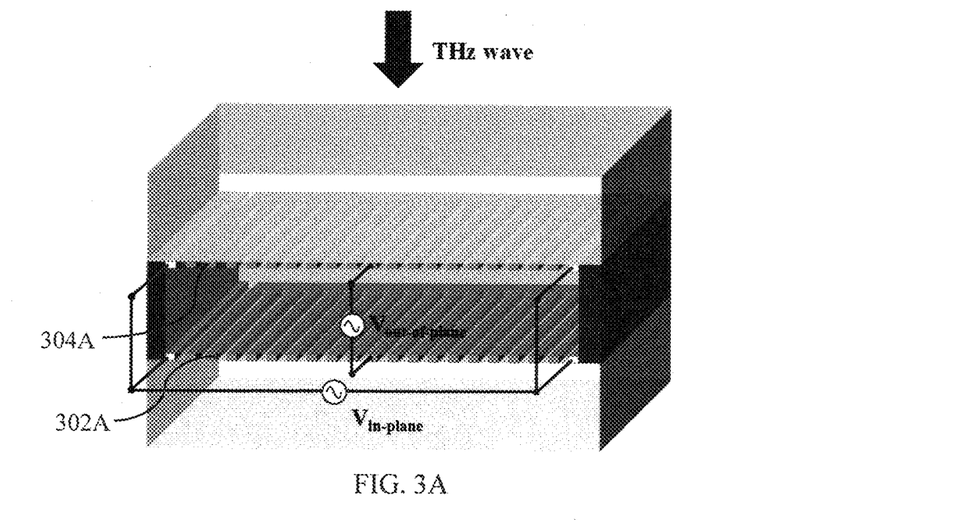
FIGS. 3A-3B are perspective views of transmissive THz LC devices, according to various embodiments.
Figure 3B:
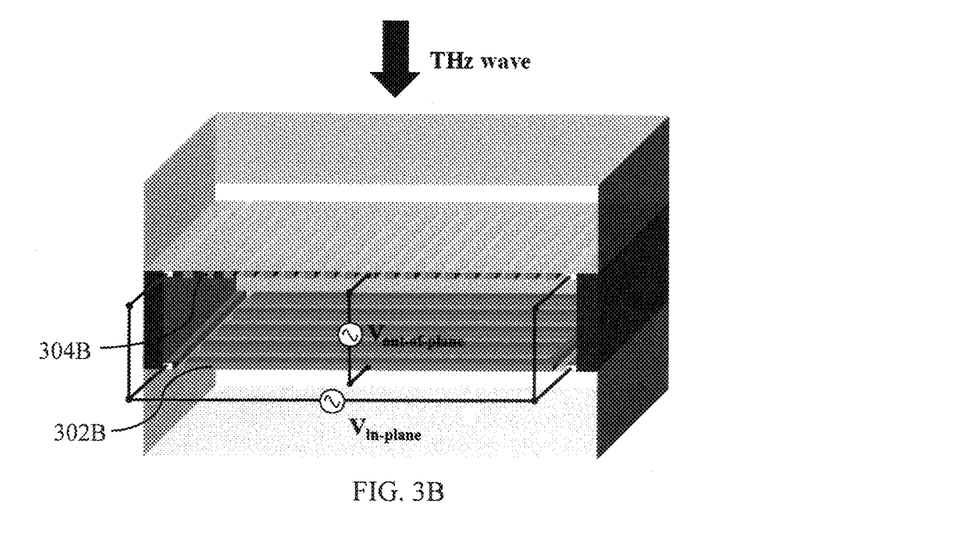

FIGS. 3A-3B are perspective views of transmissive THz LC devices, according to various embodiments. FIG. 3A shows a wire-grid patterned electrode 302A on the output window that is parallel to a wire-grid patterned electrode 304A on the input window. FIG. 3B shows a wire-grid patterned electrode 302B on the output window that is perpendicular to a wire-grid patterned electrode 304B on the input window. For transmissive devices, like in like FIG. 2A and FIG. 2B, the output polarization from THz LC devices depends on the angle of wire-grid pattern direction.

Figure 3C:
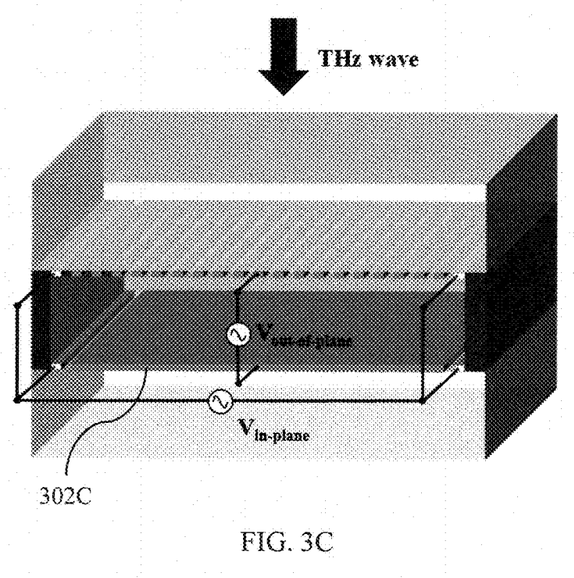
FIG. 3C is a perspective overview of a reflective THz LC device, according to one embodiment.

FIG. 3C is a perspective overview of a reflective THz LC device, according to one embodiment. Alternatively, on the output window, some embodiments of the invention can have a THz mirror 302C for reflective devices, as shown in FIG. 3C.

Figure 4A:
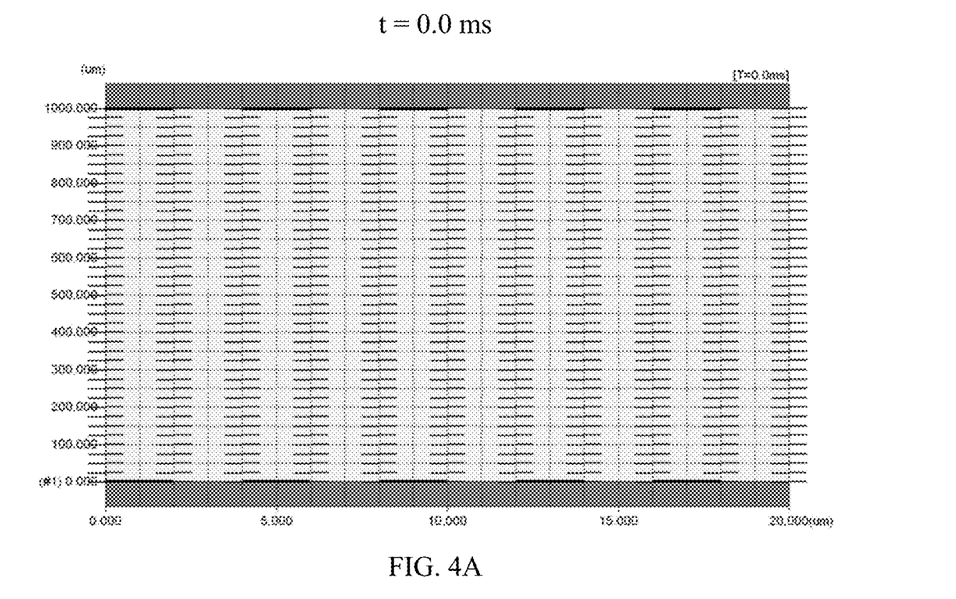
FIG. 4A is a simulation result of initial liquid crystal alignment, according to one embodiment.
Figure 4B:
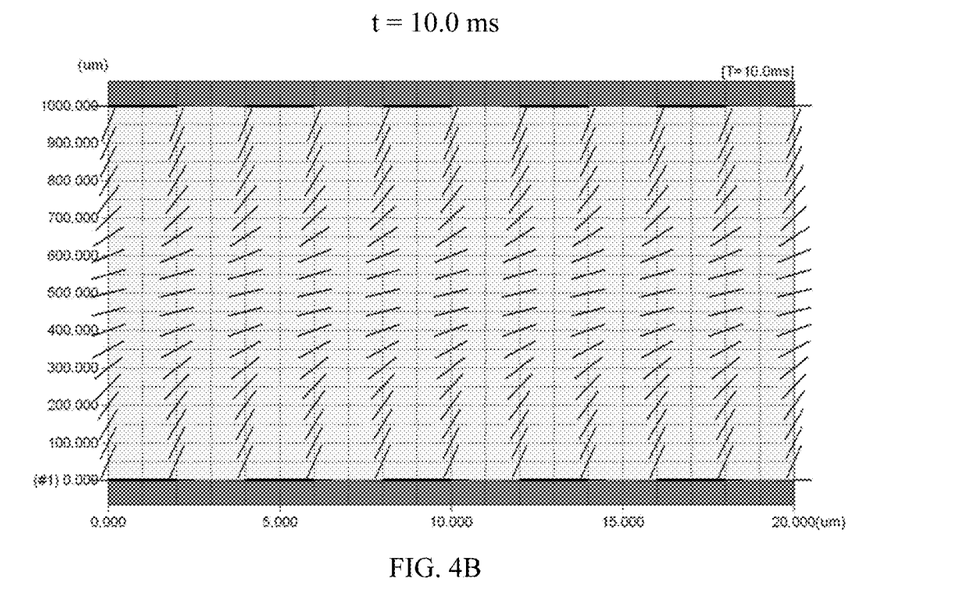
FIG. 4B is a simulation result of liquid crystal alignment 10 ms after applying the bias to the out-of-plane electrodes, according to one embodiment.
Figure 4C:
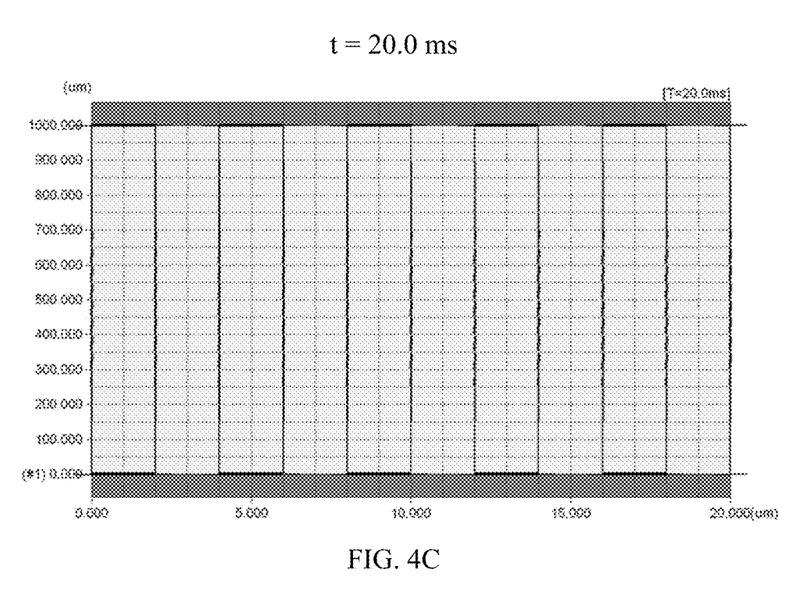
FIG. 4C is a simulation result of liquid crystal alignment 20 ms after applying the bias to the out-of-plane electrodes, according to one embodiment.
Figure 5A:
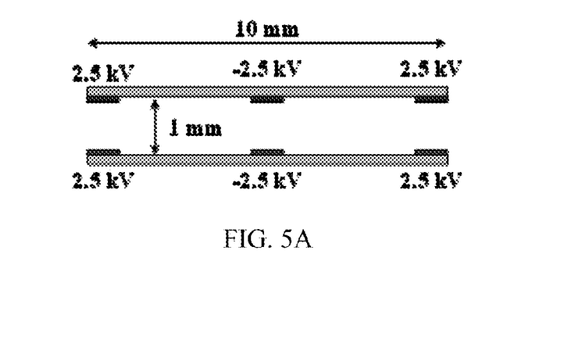
FIG. 5A is cross-sectional view of a THz LC device, according to one embodiment.

FIGS. 4A-4C illustrate a simulation result of a LC structure, according to one embodiment. In the simulation, the thickness of the liquid crystal layer is 1 mm and the applied electric bias voltage is 1 kV for the out-of-plane electric field. The distance between two in-plane electrodes is 5 mm and the applied electric bias voltage is 5 kV. FIG. 5A is cross-sectional view of such a THz LC device, according to one embodiment.

FIGS. 4A-4C show the change of the liquid crystal directors under the out-of-plane electric fields. FIG. 4A is a simulation result of initial liquid crystal alignment, according to one embodiment. FIG. 4B is a simulation result of liquid crystal alignment 10 ms after applying the bias to the out-of-plane electrodes, according to one embodiment. FIG. 4C is a simulation result of liquid crystal alignment 20 ms after applying the bias to the out-of-plane electrodes, according to one embodiment.

The simulations show that after 20 ms the liquid crystal directors are aligned well with the out-of-plane electric fields (i.e., the direction of the liquid crystal director is the same as the direction of the out-of-plane electric field).

Figure 5B:
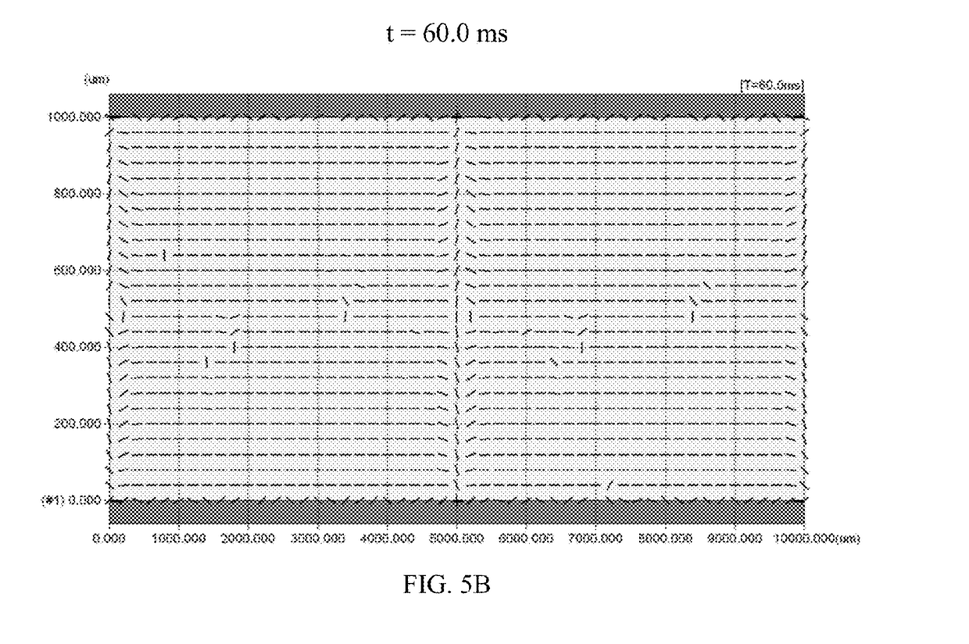
FIG. 5B is a simulation result of liquid crystal alignment 60 ms after applying in-plane electric field, according to one embodiment.

Similarly, FIG. 5B shows that the liquid crystal directors are well aligned at 60 ms after applying in-plane electric field, according to one embodiment. (i.e., the direction of the liquid crystal director is the same as the direction of the in-plane electric field).

These simulations confirm that the liquid crystal directors can be controlled by the two different bias fields and the bias field is well aligned in the devices.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A liquid crystal cell, comprising:
   a first window transparent at terahertz (THz) frequencies between 0.1 THz to 10.0 THz;
   a second window transparent at THz frequencies between 0.1 THz to 10.0 THz;
   a liquid crystal layer, disposed between the first and second windows;
   a first plurality of in-plane switching electrodes, configured to generate in-plane electric fields over the liquid crystal layer, disposed between the liquid crystal layer and the first window;
   a second plurality of in-plane switching electrodes, configured to generate in-plane electric fields over the liquid crystal layer, disposed between the liquid crystal layer and the second window;
   a first plurality of out-of-plane switching electrodes, configured to generate out-of-plane electric fields that are perpendicular to the liquid crystal layer, disposed between the liquid crystal layer and the first window; and
   a second plurality of out-of-plane switching electrodes, configured to generate out-of-plane electric fields that are perpendicular to the liquid crystal layer, disposed between the liquid crystal layer and the second window;
   wherein the first and second pluralities of in-plane switching electrodes and the first and second pluralities of out-of-plane switching electrodes are wire-grid electrodes and are configured to be controlled independently to tune optical properties of the liquid crystal cell.

2. The liquid crystal cell of claim 1, further comprising one or more liquid crystal alignment layers for defining the initial alignment for liquid crystal molecules in the liquid crystal layer.

3. The liquid crystal cell of claim 2, wherein the liquid crystal alignment layers are fabricated by rubbing, silicon monoxide (SiO) oblique evaporation, ion beam etching, and/or photo-alignment.

4. The liquid crystal cell of claim 1, further comprising a protective layer placed on the first window to improve the stability of the liquid crystal cell.

5. The liquid crystal cell of claim 1, wherein the first window comprises an input window and the second window comprises an output window for THz waves.

6. The liquid crystal cell of claim 1, wherein the in-plane switching electrodes and the out-of-plane switching electrodes are comprised of an optically transparent material.

7. The liquid crystal cell of claim 6, wherein the transparent material comprises indium tin oxide (ITO).

8. The liquid crystal cell of claim 1, wherein the in-plane switching electrodes and the out-of-plane switching electrodes are comprised of metals.

9. The liquid crystal cell of claim 1, wherein the first window has an anti-reflection coating layer or an anti-reflection structure on a surface of the first window to improve THz wave transmittance.

10. The liquid crystal cell of claim 1, where in the liquid crystal layer is configured to act as a phase retardation plate in the THz frequency range between 0.1 THz to 10.0 THz.

11. The liquid crystal cell of claim 1, wherein the liquid crystal layer is configured to act as a half-wave plate in the THz frequency range between 0.1 THz to 10.0 THz.

12. The liquid crystal cell of claim 1, wherein the liquid crystal layer is configured to act as a quarter-wave plate in the THz frequency range between 0.1 THz to 10.0 THz.

* * * * *